(12) United States Patent
Berry et al.

(10) Patent No.: US 11,461,790 B1
(45) Date of Patent: Oct. 4, 2022

(54) MARKETING COMPLIANCE TECHNOLOGIES

(71) Applicant: Kara Technology Inc., New York, NY (US)

(72) Inventors: Marie Berry, Brooklyn, NY (US); Dalton James Ridenhour, New York, NY (US); Brandon Lane McCain, Brooklyn, NY (US)

(73) Assignee: Kara Technology Inc., New York, NY (US)

( * ) Notice: Subject to any disclaimer, the term of this patent is extended or adjusted under 35 U.S.C. 154(b) by 431 days.

(21) Appl. No.: 16/776,277

(22) Filed: Jan. 29, 2020

Related U.S. Application Data

(60) Provisional application No. 62/798,327, filed on Jan. 29, 2019.

(51) Int. Cl.
*G06Q 30/00* (2012.01)
*G06Q 10/10* (2012.01)
(Continued)

(52) U.S. Cl.
CPC ..... *G06Q 30/0185* (2013.01); *G06F 16/2246* (2019.01); *G06F 40/226* (2020.01); *G06Q 10/10* (2013.01)

(58) Field of Classification Search
CPC .............. G06Q 30/0185; G06Q 10/10; G06F 16/2246; G06F 40/226
(Continued)

(56) References Cited

U.S. PATENT DOCUMENTS

| 10,924,778 | B1* | 2/2021 | Shivapurkar | .... H04N 21/26258 |
| 2009/0157452 | A1* | 6/2009 | Arora | ..................... G06Q 30/02 |
| | | | | 705/7.29 |

(Continued)

OTHER PUBLICATIONS https://www.workfront.com/blog, "How to Protect Brand Identity with Marketing Compliance", https://www.workfront.com/blog/how-to-protect-brand-identity-with-marketing-compliance, May 7, 2018 (Year: 2018).*

(Continued)

*Primary Examiner* — Sangeeta Bahl
*Assistant Examiner* — Joshua D Schneider
(74) *Attorney, Agent, or Firm* — Ulmer & Berne LLP

(57) ABSTRACT

Technologies for automatically validating marketing asset compliance include a marketing compliance server configured to receive a marketing asset file. The marketing asset file includes a data interchange document containing multiple objects and multiple key/value pairs. Each object is associated with a different group of the key/value pairs. The server extracts the data interchange document from the marketing asset file, parses the document to identify the different key/value pair groups, and identifies the objects of the document based on the identification of the different key/value pair groups. The identified objects are analyzed as a function of a brand rule configuration file that includes brand rules corresponding to brand marketing guidelines. Based on the analysis, the server determines whether the objects are in compliance with the marketing guidelines. The server generates an interactive compliance report and non-compliant objects can be corrected. Other embodiments are described and claimed.

20 Claims, 7 Drawing Sheets

(51) Int. Cl.
 *G06F 9/22* (2006.01)
 *G06F 16/22* (2019.01)
 *G06F 40/226* (2020.01)

(58) Field of Classification Search
 USPC .......................................................... 705/318
 See application file for complete search history.

(56) References Cited

U.S. PATENT DOCUMENTS

| | | | | |
|---|---|---|---|---|
| 2013/0046683 A1* | 2/2013 | Onder | ................ | G06Q 30/0244 705/317 |
| 2015/0081389 A1* | 3/2015 | Dereszynski | ...... | G06Q 30/0204 705/7.33 |
| 2015/0100432 A1* | 4/2015 | Shepherd | ........... | G06Q 30/0271 705/14.67 |

OTHER PUBLICATIONS

Kevin Groome, "How to Make Brand Compliance Easy for Local Marketers",https://www.pica9.com/blog/make-local-brand-compliance-easy, Jun. 14, 2017 (Year: 2017).*

John Avellanet, "Can compliance help marketing and business development?", Journal of Commercial Biotechnology, vol. 14, 283-286 (2008). https://doi.org/10.1057/jcb.2008.29, Sep. 29, 2008 (Year: 2008).*

Erika Voeller, "9 Steps To Building Brand Identity Guidelines", https://www.oliveandcompany.com/blog/building-brand-identity-guidelines, Sep. 18, 2017 (Year: 2017).*

* cited by examiner

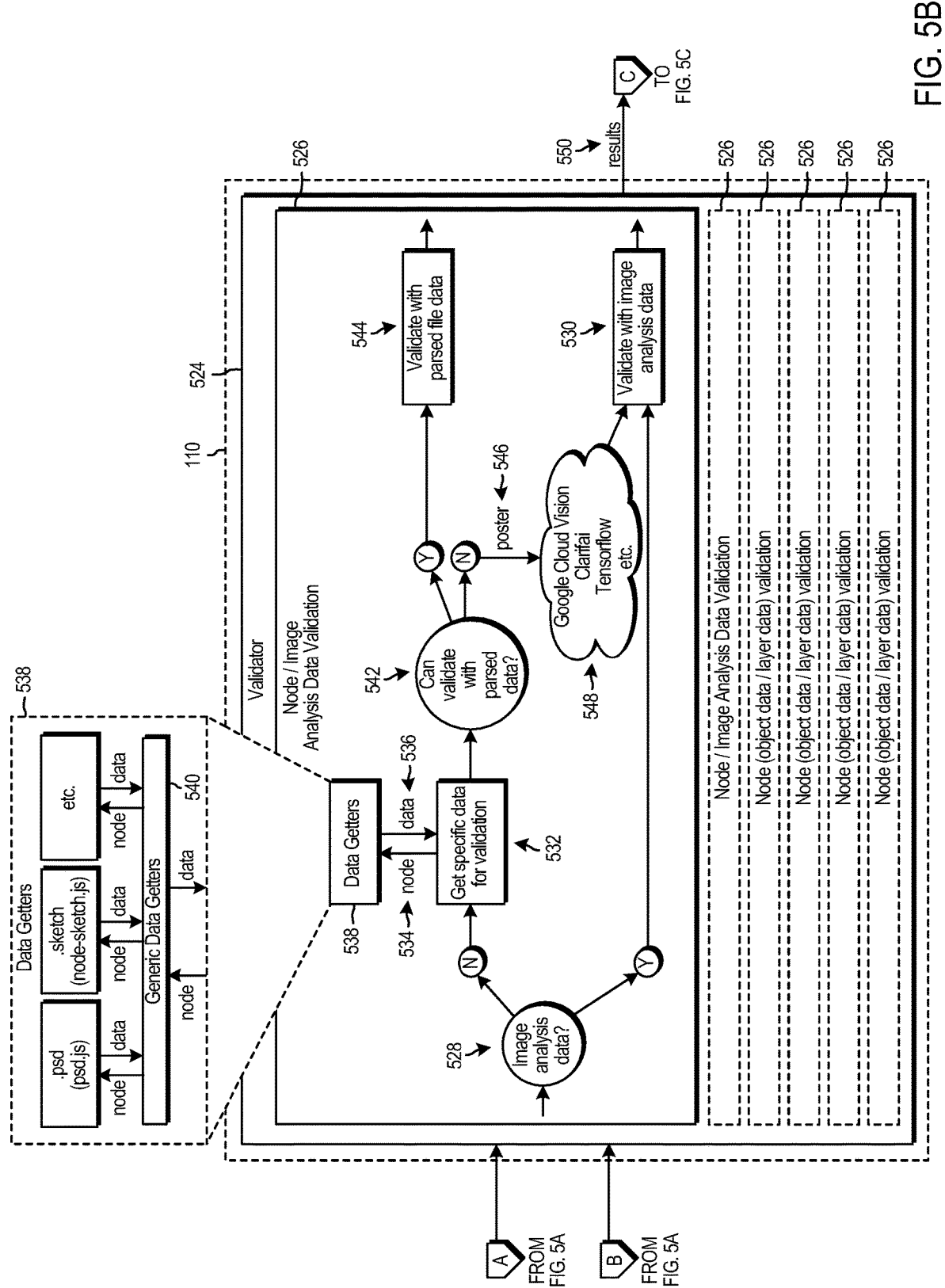

MARKETING COMPLIANCE TECHNOLOGIES

CROSS REFERENCE TO RELATED APPLICATION

This application claims the benefit of U.S. Provisional Patent Application No. 62/798,327, filed on Jan. 29, 2019, the disclosure of which is hereby incorporated herein by reference in its entirety.

TECHNICAL FIELD

Embodiments of the technologies described herein relate, in general, to marketing compliance technologies. More particularly, the technologies described herein relate to the automated compliance processing of marketing materials to ensure brand consistency.

BRIEF DESCRIPTION OF THE DRAWINGS

It is believed that certain embodiments will be better understood from the following description taken in conjunction with the accompanying drawings, in which like references indicate similar elements and in which:

FIGS. 5A-C is a simplified system processing flow diagram of an alternative embodiment of compliance processing that may be performed by the marketing compliance server of FIGS. 1 and 2 for validating and correcting marketing assets.

DETAILED DESCRIPTION

Figure 1:
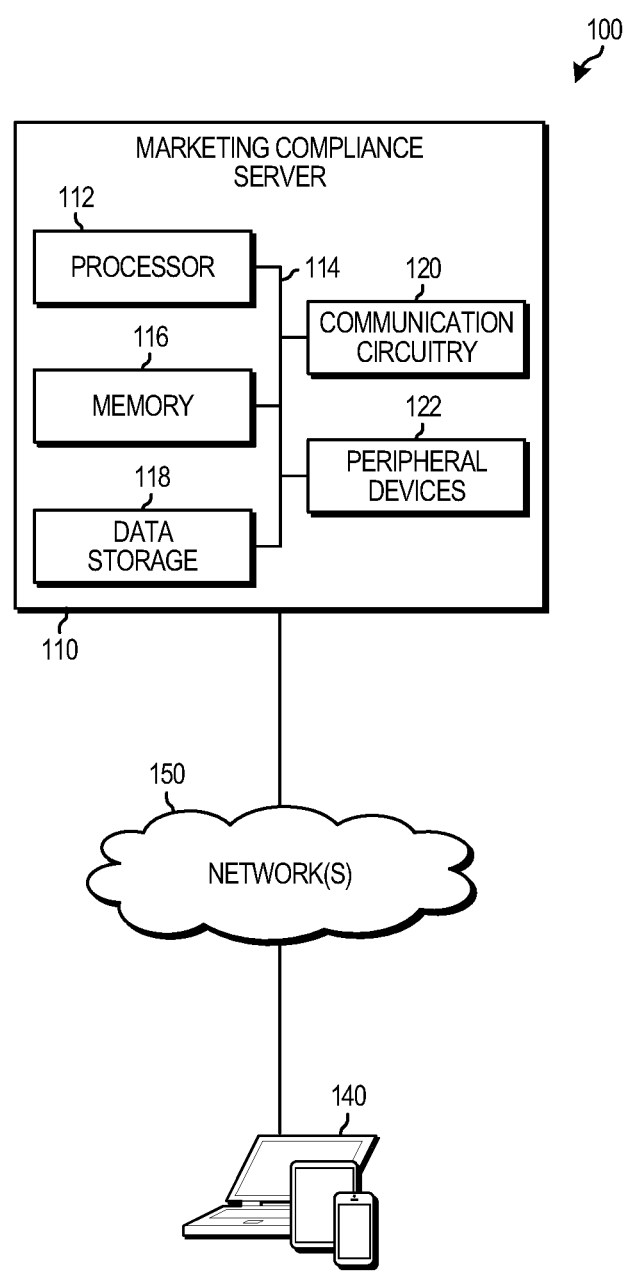
FIG. 1 is an illustrative diagram of at least one embodiment of a system for automatic compliance processing of marketing assets.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware.

The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Figure 2:
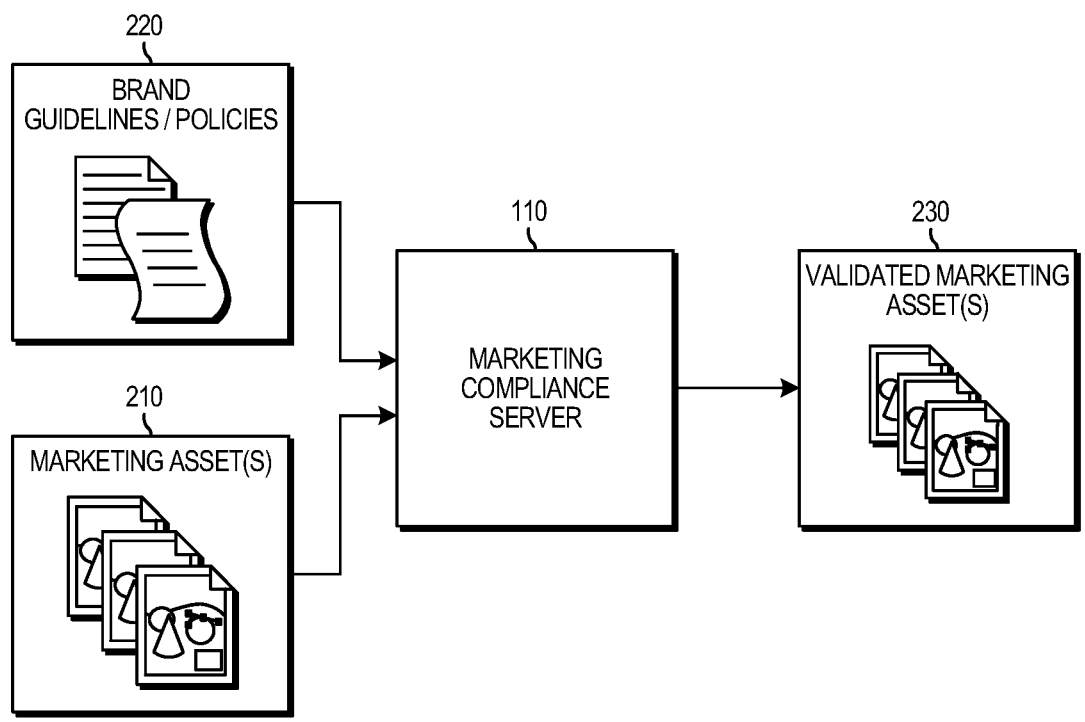
FIG. 2 is a simplified block diagram of at least one embodiment of inputs and outputs of the marketing compliance server of FIG. 1.

Referring now to FIGS. 1-2, in one embodiment, a system 100 for automatic compliance processing of marketing assets includes a marketing compliance server 110 configured to communicate with one or more computing devices 140 over one or more networks 150. As described in detail below, compliance processing can include automatic validation of marketing assets and/or automatic correction of non-compliant marketing assets. In some embodiments, the marketing compliance server 110 is configured to receive brand guidelines 220 from the one or more computing devices 140. Companies or other brand owners may develop specific brand guidelines 220 (e.g., policies) to ensure consistency among marketing materials. Such guidelines/policies 220 may be developed for use in connection with a specific marketing campaign (e.g., seasonal, markets, launches, etc.), or they may be developed for global use by the company and/or brand owner. The brand guidelines 220 include one or more brand rules that specify various content and/or visual appearance requirements of marketing assets prepared to promote the brand and associated products and/or services. The marketing compliance server 110 is configured to receive or generate one or more brand rule configuration file(s) based at least in part on, or otherwise as a function of the brand guidelines 220 received from the computing device(s) 140. Additionally or alternatively, the marketing compliance server 110 is configured to receive or generate the one or more brand rule configuration file(s) based at least in part on, or otherwise as a function of individual brand rules received from the computing device(s) 140. It should be appreciated that once the brand rule configuration file(s) have been generated or received by the marketing compliance server 110, they need not be generated and/or received again unless changes are made to the brand guidelines 220 (or a specific brand rule included therein). Additionally, as discussed herein, the brand rule configuration file(s) may each include human-readable attributes and corresponding values to be passed to generic functions via function calls, one or more hardcoded functions to be executed directly, or a combination thereof. Such functions—generic functions receiving the attributes/values or hardcoded functions executed directly—may be configured to validate and/or correct one or more objects and/or layers of a marketing asset when executed by the marketing compliance server 110. It should be appreciated that the marketing asset may be embodied as marketing materials generated and distributed in a digital format or marketing materials distributed in print format but are later digitized for processing.

In operation, the marketing compliance server 110 is also configured to receive one or more marketing assets 210 from the computing device(s) 140. Additionally or alternatively, the marketing assets 210 may be retrieved from local storage of the marketing compliance server 110 or from a remote storage device (e.g., a storage server, a cloud-based storage platform, a remote server, etc.). The marketing asset(s) 210 include various objects or content (e.g., images, text, interactive objects, etc.) designed to promote a product or service of the brand. In some embodiments, the marketing asset(s) 210 includes vector-based content, raster based content, and/or a combination of vector-based content and raster-based content. Additionally, the marketing asset(s) 210 may be layered image file (e.g., a .SKETCH file, a .PSD file, etc.), in some embodiments.

After receiving the marketing asset(s) 210 and generation or retrieval of the brand rule configuration file(s), the marketing compliance server 110 is configured to unpack/disassemble the received marketing asset(s) 210 into their component parts (e.g., documents, images, etc.). In the illustrative embodiment, the marketing asset(s) 210 are layered image files including data interchange documents (e.g., JavaScript Object Notation (.JSON) documents, etc.) and image files (e.g., raster image files, vector image files, etc.). It should be appreciated that the marketing asset(s) 210 may include contain any other suitable document type and image type. Additionally, it should be appreciated that unpacking/disassembling the marketing asset(s) 210 can include extracting the data interchange documents (e.g., .JSON documents, etc.), image files, and/or any other type of content from marketing asset(s) 210.

The marketing compliance server 110 is also configured to identify the component layers/objects of unpacked/disassembled marketing assets 210. To do so, the marketing compliance server 110 is configured to parse the .JSON documents (or other data interchange document type) of the unpacked marketing asset(s) 210 and identify one or more key/value pairs (or name/value pairs) contained therein. The key/value pairs of the .JSON documents correspond to individual object/layers and their corresponding properties (e.g., X/Y coordinates, dimensions, colors, horizontal alignment, vertical alignment, font type, font size, etc.). The marketing compliance server 110 may also be configured to generate a hierarchical tree structure of the various layers/objects identified within the parsed documents of the marketing asset(s) 210. Such hierarchical tree structure may facilitate easier programmatic access to the various layers/objects of the documents and images unpacked from the marketing asset(s) 210. As such, in some embodiments, each layer and/or object identified within a marketing asset 210 may represent a separate "node" in the hierarchical tree structure. It should be appreciated that the marketing compliance server 110 may also generate any other suitable organizational structure of the various layers/objects identified within the parsed documents of the marketing asset(s) 210.

Additionally, the marketing compliance server 110 is configured to determine whether the identified layers/objects comply with the various brand rules of the brand guidelines 220. To do so the marketing compliance server 110 analyzes the identified layers/objects as a function of the brand rule configuration file(s). For example, in some embodiments, the marketing compliance server 110 compares the key/value pairs associated with an object and/or a layer of the marketing asset 210 to reference values and other requirements defined in the brand rule configuration file(s) and/or brand rules.

As discussed, the brand rule configuration file(s) may include attributes and corresponding values configured to be passed to one or more generic functions, which when executed by the marketing compliance server 110, are configured to validate and/or correct one or more objects and/or layers of a marketing asset 210. Additionally or alternatively, the brand rule configuration file(s) may include functions configured to validate and/or correct one or more objects and/or layers of the marketing asset 210 when executed by the marketing compliance server 110. The functions of the brand rule configuration file(s), and/or the generic functions called by the brand rule configuration file(s), may be configured to accept as inputs the name of a layer/object and the unpacked document from which it was identified. Additionally or alternatively, the functions of the brand rule configuration file(s), and/or the generic functions called by the brand rule configuration file(s), may be configured to accept as inputs the actual layers/objects (e.g., "node") themselves. The functions of the brand rule configuration file(s), and/or the generic functions called by the brand rule configuration file(s), may be configured to also accept as inputs one or more key/value pairs corresponding to a layer/object of the marketing asset 210 to be validated or corrected. As such, in some embodiments, the marketing compliance server 110 may be configured to validate multiple layers/objects identified in one or more documents via execution of functions of the brand rule configuration file(s). It should be appreciated that such functions, and therefore the brand rule configuration file(s), may be executed serially or in parallel by the marketing compliance server 110. It should also be appreciated that such functions and/or the brand rule configuration file(s) may be executed more than once. For example, the brand rule configuration file(s), or one or more of the function(s) contained therein, may be iteratively executed until all of the identified layers/objects of the unpacked documents are analyzed.

In some embodiments, the marketing compliance server 110 is also configured to analyze the content of the layers/objects including raster images. To do so, the marketing compliance server 110 may be configured to utilize object detection and/or facial recognition to identify the content included therein. It should be appreciated that the marketing compliance server 110 may use any suitable form of image analysis or machine learning to identify the content included within the layers/objects having raster images.

Additionally, in some embodiments, the marketing compliance server 110 is configured to generate one or more notifications (e.g., pop-up windows, notification dialogs, email messages, etc.) in response to determining that one or more identified layers/objects fail to comply with the one or more brand rules of the brand guidelines 220. For example, in response to determining that one or more identified layers/objects fail to comply with the one or more brand rules of the brand guidelines 220, the marketing compliance server 110 may be configured to email a brand or company's Chief Marketing Officer, a marketing campaign lead, a team or other group of individuals, or any other person involved with the brand and/or the marketing asset(s) 210. As discussed in more detail below, the marketing compliance server 110 is also configured to generate an interactive compliance report based on the analysis of the identified layers/objects (see illustrative interactive compliance report 400 of FIG. 4).

In accordance with various embodiments, the marketing compliance server 110 can also be configured to automatically correct one or more layers/objects of the marketing asset(s) 210. To do so, the marketing compliance server 110 is configured to modify one or more values (e.g., X/Y coordinates, dimensions, colors, horizontal alignment, vertical alignment, font type, font size, etc.) of the noncompliant layers/objects such that they conform to the brand rules and therefore the brand guidelines 220. Additionally, in some embodiments, the marketing compliance server 110 is configured to facilitate finalization of the approval process. Once finalized, the approved/validated marketing assets 230 may be released for live use.

The marketing compliance server 110 can be embodied as any type of computing device or server capable of processing, communicating, storing, maintaining, and transferring data. For example, the marketing compliance server 110 can be embodied as a microcomputer, a minicomputer, a custom chip, an embedded processing device, a mobile computing device, a handheld computer, a smart phone, a tablet computer, a personal digital assistant, a laptop computer, a desktop computer, and/or other computing device or suitable programmable device. In some embodiments, the marketing compliance server 110 can be embodied as a computing device integrated with other systems or subsystems. As illustratively shown in FIG. 1, the marketing compliance server 110 includes a processor 112, a system bus 114, a memory 116, a data storage 118, communication circuitry 120, and one or more peripheral devices 122. Of course, the marketing compliance server 110 can include other or additional components, such as those commonly found in a computer and/or server (e.g., various input/output devices), in other embodiments. Additionally, in some embodiments, one or more of the illustrative components can be incorporated in, or otherwise from a portion of, another component. For example, the memory 116, or portions thereof, can be incorporated in the processor 112 in some embodiments. Furthermore, it should be appreciated that the marketing compliance server 110 can include other components, sub-components, and devices commonly found in a computer and/or computing device, which are not illustrated in FIG. 1 for clarity of the description.

The processor 112 can be embodied as any type of processor capable of performing the functions described herein. For example, the processor 112 can be embodied as a single or multi-core processor, a digital signal processor, a microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or any other type of processor or processing/controlling circuit or controller.

In various configurations, the marketing compliance server 110 includes a system bus 114 for interconnecting the various components of the marketing compliance server 110. The system bus 114 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 112, the memory 116, and other components of the marketing compliance server 110. In some embodiments, the marketing compliance server 110 can be integrated into one or more chips such as a programmable logic device or an application specific integrated circuit (ASIC). In such embodiments, the system bus 114 can form a portion of a system-on-a-chip (SoC) and be incorporated, along with the processor 112, the memory 116, and other components of the marketing compliance server 110, on a single integrated circuit chip.

The memory 116 can be embodied as any type of volatile or non-volatile memory or data storage capable of performing the functions described herein. For example, the memory 116 can be embodied as read only memory (ROM), random access memory (RAM), cache memory associated with the processor 112, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 116 can store various data and software used during operation of the marketing compliance server 110 such as operating systems, applications, programs, libraries, and drivers.

The data storage 118 can be embodied as any type of device or devices configured for short-term or long-term storage of data such as, for example, memory devices and circuits, memory cards, hard disk drives, solid-state drives, or other data storage devices. For example, in some embodiments, the data storage 118 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 112, or the memory 116 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 120 of the marketing compliance server 110 may be embodied as any type of communication circuit, device, interface, or collection thereof, capable of enabling communications between the marketing compliance server 110, the computing device(s) 140, and/or any other computing or processing devices communicatively coupled thereto. For example, the communication circuitry 120 may be embodied as one or more network interface controllers (NICs), in some embodiments. The communication circuitry 120 may be configured to use any one or more communication technologies (e.g., wireless or wired communications) and associated protocols (e.g., Ethernet, WiMAX, etc.) to effect such communication. In the illustrative embodiment, the communication circuitry 120 includes a wireless communication interface (e.g., Wi-Fi®, Bluetooth®, mesh network, etc.) configured to enable communications between the marketing compliance server 110 and the computing device(s) 140 and/or any other computing or processing device. Additionally or alternatively, in some embodiments, the communication circuitry 120 includes a wired communication interface (e.g., Ethernet, coaxial communication interface, USB, serial communication interface, parallel communication interface, etc.) configured to enable communications directly between the marketing compliance server 110 and the computing device(s) 140 via a physical communications connection.

In some embodiments, the marketing compliance server 110, the computing device(s) 140, and/or any other computing or processing devices of the system 100, can communicate with each other over one or more networks 150. The network(s) 150 can be embodied as any number of various wired and/or wireless communication networks. For example, the network(s) 150 can be embodied as or otherwise include a local area network (LAN), a wide area network (WAN), a cellular network, or a publicly-accessible, global network such as the Internet. Additionally, the network(s) 150 can include any number of additional devices to facilitate communication between the computing devices of the system 100.

Additionally, in some embodiments, the marketing compliance server 110 can further include one or more peripheral devices 122. Such peripheral devices 122 can include any type of peripheral device commonly found in a computing device such as various user interface devices (e.g., a joystick, buttons, controls, a hardware keyboard, a keypad, a gesture or graphical input device, a motion input device, a vibratory device, a computer mouse, a voice recognition unit, etc.), a display and/or a touchscreen interface, additional data storage, speakers, an audio unit, a peripheral communication device, and any other suitable user interface, input/output device, and/or other peripheral device.

The computing device(s) 140 may be embodied as any type of computing devices capable of performing the functions described herein. As such, the computing device(s) 140 may include devices and structures commonly found in computing devices such as processors, memory devices, communication circuitry, and data storages, which are not shown in FIG. 1 for clarity of the description. In some embodiments, the computing device(s) 140 are configured to enable users to interact with the marketing compliance server 110 via the network(s) 150. To do so, in some embodiments, the computing device(s) 140 may be configured to access or otherwise communicate with the marketing compliance server 110 via one or more web pages (e.g., HTML pages, PHP pages, etc.) or a web-browser application (e.g., an HTML application or the like). For example, the user may utilize a web-browser executing on the computing device(s) 140 such as Safari™ Opera™, Google™ Chrome™, Internet Explorer™, or the like to interact with the marketing compliance server 110. As discussed in more detail below, the marketing compliance server 110 can be configured to, among other things, receive brand rule data and marketing assets from the computing device(s) 140, analyze the marketing assets as a function of the brand rule data, generate an interactive brand compliance report, correct noncompliant objects and/or layers of the marketing asset, facilitate final approval and delivery of the originally-provided and/or subsequently-corrected marketing assets.

Figure 3:
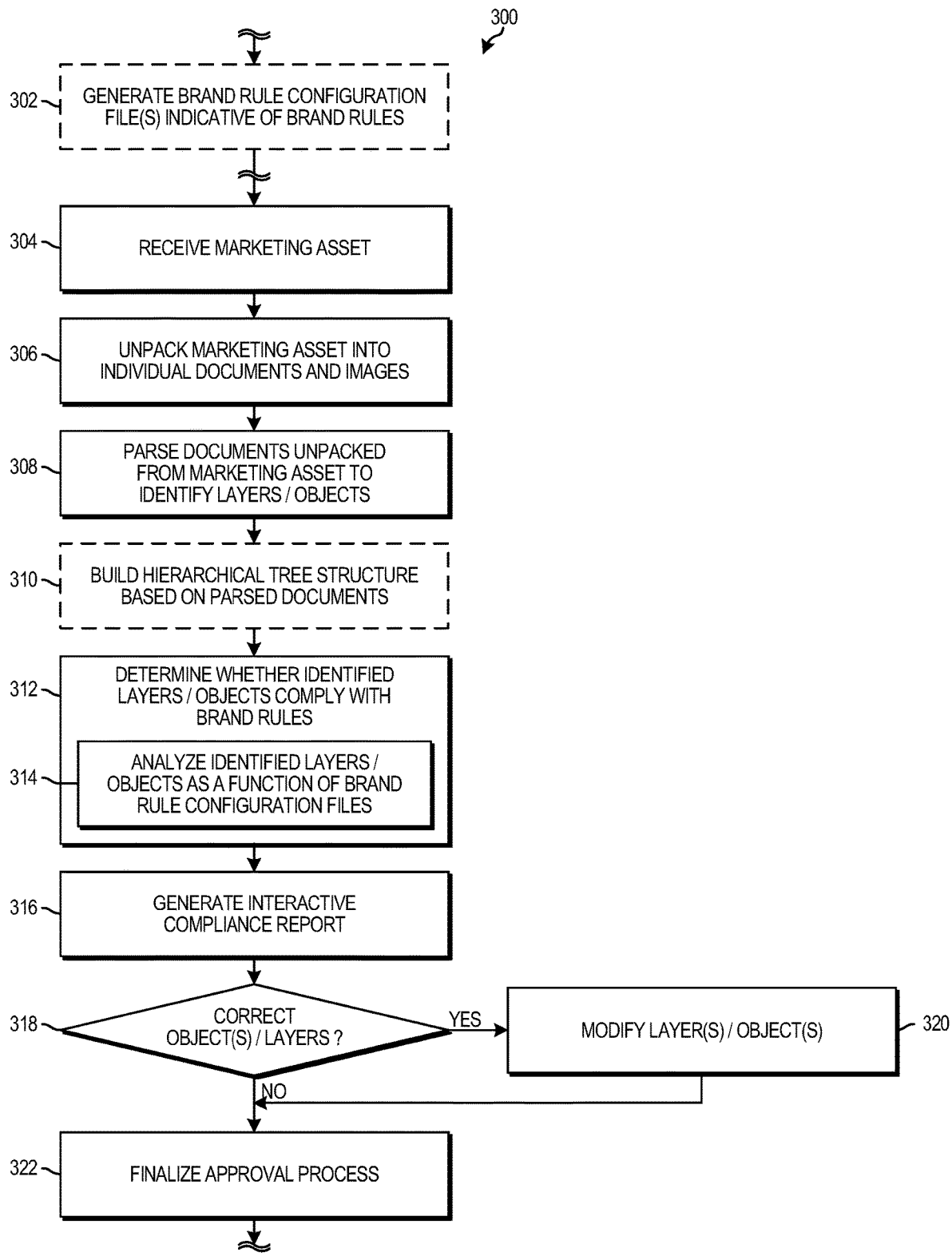
FIG. 3 is a simplified flow diagram of at least one embodiment of a method of compliance processing that may be executed by the marketing compliance server of FIGS. 1 and 2 for validating and correcting marketing assets.

Referring now to FIG. 3, a method 300 that may be executed by the marketing compliance server 110 for validating and correcting marketing assets (e.g., digital marketing assets, digitized versions of print marketing assets, etc.) is shown. In some embodiments, in block 302, the marketing compliance server 110 generates one or more brand rule configuration file(s) based at least in part on, or otherwise as a function of one or more brand rules. As discussed above, companies or other brand owners may develop specific brand guidelines 220 to ensure consistency among marketing materials. Such guidelines may be developed for user for a specific marketing campaign, or they may be developed for global use by the company and/or brand owner. The brand guidelines 220 include one or more brand rules that specify various content and/or visual appearance requirements of marketing assets prepared to promote the brand and associated products and/or services. In some embodiments, the marketing compliance server 110 receives the brand guidelines 220 from a user via the computing device(s) 140. Additionally or alternatively, the marketing compliance server 110 can receive the brand guidelines 220 from the computing device 140 in the form of a data file. In either case, the marketing compliance server 110 may be configured to analyze the received brand guideline data and generate the brand rule configuration file(s) therefrom. It should be appreciated that once the brand rule configuration file(s) have been generated or received by the marketing compliance server 110, they need not be generated and/or received again unless changes are made to the brand guidelines 220 (or a specific brand rule included therein).

As discussed herein, in some embodiments, the brand rule configuration file(s) may be in a human-readable format and include attribute values indicative of one or more brand rules and requirements thereof. For example, a brand rule configuration file may include an attribute value specifying the color of a vector object should be "red" and that the object should be vertically aligned (e.g., "color: red;" "vertical-align: middle;" etc.). It should be appreciated that any other suitable attribute and corresponding value may be included with the brand rule configuration file(s). In such embodiments, the brand rule configuration file(s) may include instructions that, when executed by the marketing compliance server 110, pass the attributes and corresponding values to one or more generic functions (via function call or other mechanism), which may be configured to validate and/or correct one or more objects and/or layers of a marketing asset. In other embodiments, the brand rule configuration file(s) may each include one or more hardcoded functions configured to validate and/or correct one or more objects and/or layers of a marketing asset when executed by the marketing compliance server 110. It should also be appreciated that, in some embodiments, the brand rule configuration file(s) may include a combination of human readable attributes/values configured to be passed to generic functions and hardcoded functions configured to be directly executed by the marketing compliance server 110.

In block 304, the marketing compliance server 110 receives a marketing asset 210 from a computing device 140. Alternatively, the marketing compliance server 110 may retrieve the marketing asset 210 from local data storage (e.g., the data storage 118) or remote data storage (not shown). The marketing asset 210 includes various objects or content (e.g., images, text, interactive objects, etc.) designed to promote a product or service of the brand. In some embodiments, the marketing asset 210 includes vector-based content, raster based content, or a combination of vector-based content and raster-based content. Additionally, the marketing asset 210 may be layered image file (e.g., a .SKETCH file, a .PSD file, etc.), in some embodiments.

In block 306, the marketing compliance server 110 unpacks or otherwise disassembles the received marketing asset 210 into its component parts. For example, the marketing compliance server 110 may be configured to unpack a received marketing asset 210 into the individual documents (e.g., .JSON documents, etc.) and raster images (e.g., background images, product images, model images, etc.) contained therein.

In block 308, the marketing compliance server 110 parses the documents unpacked from the marketing asset 210 to identify the layers and/or objects contained therein. To do so, in some embodiments, the marketing compliance server 110 is configured to identify one or more key/value pairs contained within the documents unpacked from the marketing asset 210. In some embodiments, the documents unpacked from the marketing asset 210 are .JSON documents containing various layers/objects defining vector-based drawings, referencing one or more raster-based images, and/or any other suitable content type. In such embodiments, the .JSON documents also specify various properties/values (e.g., X/Y coordinates, dimensions, colors, horizontal alignment, vertical alignment, font type, font size, etc.) of the included layers/objects. It should be appreciated that although the marketing compliance server 110 unpacks and parses .JSON documents from the marketing asset 210 in the illustrative embodiment, the marketing compliance server 110 may also be configured to unpack and parse any other suitable document or file type based on the format of the marketing asset 210.

In some embodiments, in block 310, the marketing compliance server 110 builds a hierarchical tree structure of the various layers/objects identified within the parsed documents of the marketing asset 210. It should be appreciated that such hierarchical tree structure, or any other suitable organizational structure, may facilitate easier programmatic access to the various layers/objects of the documents and images unpacked from the marketing asset 210. As discussed herein, each "node" of the hierarchical tree structure or other organizational structure may be representative of a separate object/layer identified within the marketing asset 210, in some embodiments.

In block 312, the marketing compliance server 110 determines whether the identified layers/objects comply with the various brand rules of the brand guidelines 220. To do so, in block 314, the marketing compliance server 110 analyzes the identified layers/objects as a function of the brand rule configuration file(s) or a generic function called thereby. As discussed, the brand rule configuration file(s) may include human-readable attributes and values configured to be passed to a generic validation and/or correction function, hardcoded validation and/or correction functions configured to be executed directly by the marketing compliance server 110, or a combination thereof. For example, in an illustrative embodiment, a brand rule configuration file may include instructions to pass attributes and/or values to a generic function configured to determine whether a layer/object is horizontally and/or vertically centered relative to an artboard layer/object (or any other reference base layer/object). In some embodiments, such instructions may be in the form of a human-readable function identifier corresponding to the generic function to be called (e.g., "ALIGNMENT.verticallyCentered," "ALIGNMENT.horizontallyCentered," etc.). The functions included in or called by the brand rule configuration file(s) may be configured to accept as inputs the name of a layer/object and the unpacked document from which it was identified. As such, in some embodiments, the marketing compliance server 110 may be configured to validate multiple layers/objects identified in one or more documents via execution of functions of the brand rule configuration file(s) and/or the functions called thereby. It should be appreciated that such functions, and therefore the brand rule configuration file(s), may be executed serially or in parallel by the marketing compliance server 110. It should also be appreciated that such functions and/or the brand rule configuration file(s) may be executed more than once. For example, the brand rule configuration file(s), or one or more of the function(s) contained therein, may be iteratively executed until all of the identified layers/objects of the unpacked documents are analyzed.

As discussed above, in some embodiments, the marketing asset 210 may include one or more layers/objects including raster images. In such embodiments, the marketing compliance server 110 is configured to analyze the content of the layers/objects including raster images. To do so, the marketing compliance server 110 may be configured to utilize object detection and/or facial recognition to identify the content included therein. It should be appreciated that the marketing compliance server 110 may use any suitable form of image analysis or machine learning to identify the content included within the layers/objects having raster images. Thereafter, the marketing compliance server 110 analyzes the content identified from the raster images as a function of the brand rule configuration file(s) (e.g., execution of hardcoded functions, execution of called functions, etc.).

Figure 4:
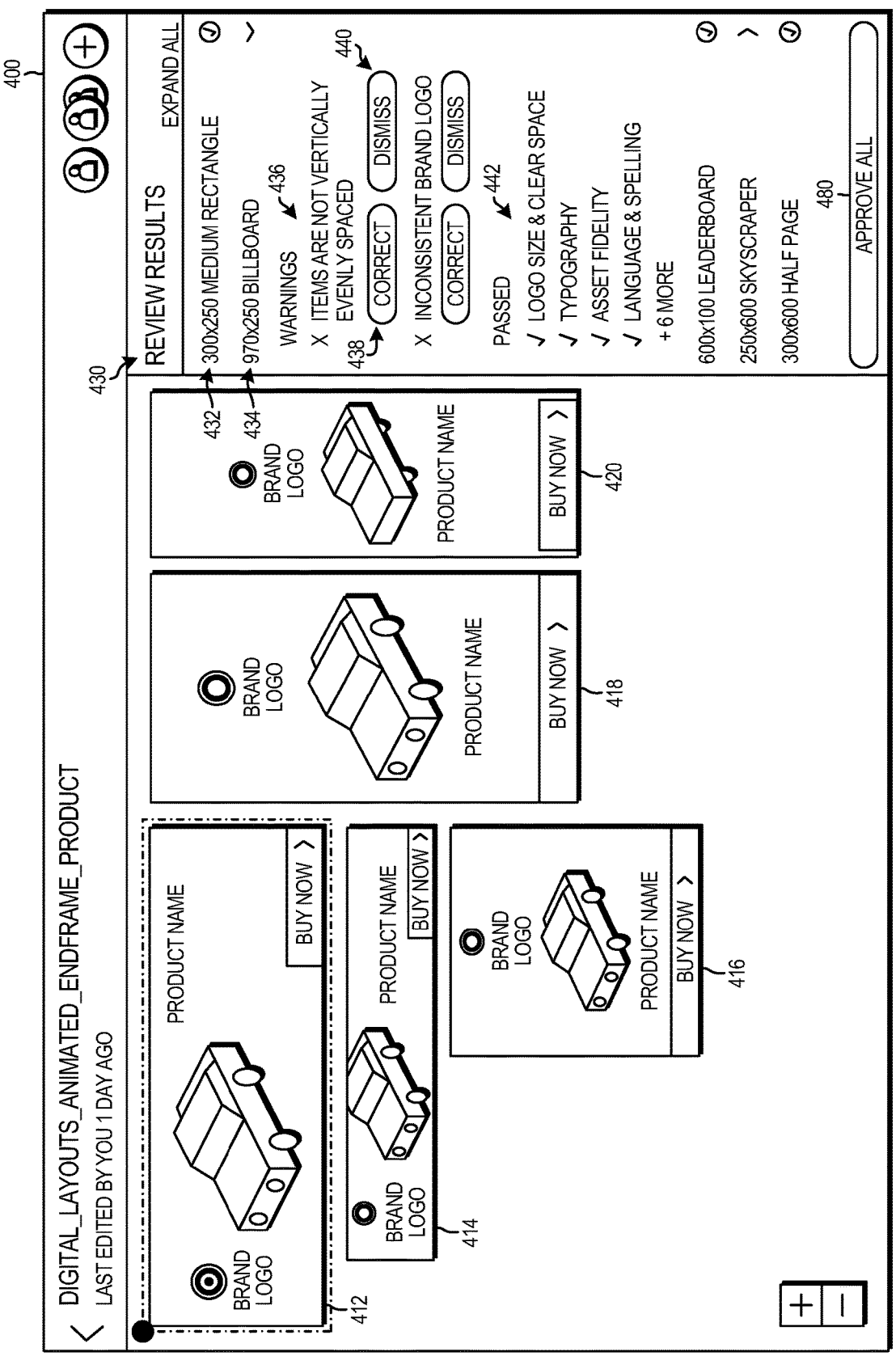
FIG. 4 is an exemplary interactive compliance report generated by the marketing compliance server of FIGS. 1 and 2.

In block 316, the marketing compliance server 110 generates an interactive compliance report based on the analysis of the identified layers/objects. For example, FIG. 4 depicts an illustrative interactive compliance report 400 that may be generated by the marketing compliance server 110. The interactive compliance report 400 generated by the marketing compliance server 110 may include a graphical representation 412, 414, 416, 418, 420 of a one or more marketing assets 210. The interactive compliance report 400 may also a include a results display portion 430, which summarizes the analysis of the identified layers/objects performed by the marketing compliance server 110 as a function of the brand rule configuration file(s) (i.e., in response to execution of hardcoded functions and/or called functions). For example, as shown in the illustrative interactive compliance report 400, the results display portion 430 may include results data 432 indicative of a determination that a particular marketing asset 210 (e.g., marketing asset graphic representation 416) complies with the brand rules and ultimately the brand guidelines 220. As also shown in the illustrative interactive compliance report 400, the results display portion 430 may also include results data 434 indicative of a determination that a particular marketing asset 210 (e.g., marketing asset graphic representation 412) does not comply with the brand rules and ultimately the brand guidelines 220. In such cases, the illustrative interactive compliance report 400 may also provide one or more user warnings 436 identifying the layers/objects that fail to comply with one or more brand rules. In doing so, the illustrative interactive compliance report 400 also provides users with an option 438 to request automatic correction of the noncompliant layer/object and an option 440 to dismiss the warning without correction. In some embodiments, the illustrative interactive compliance report 400 may also provide validation information 442 identifying the layers/objects that comply with the various brand rules. Additionally, to facilitate the approval and validation workflow of marketing assets, the interactive compliance report 400 may include an option 480 enabling users to approve all marketing assets 210. In some embodiments, the interactive compliance report 400 may also indicate that all marketing assets 210 were determined by the marketing compliance server 110 to be valid.

Referring back to FIG. 3, in decision block 318, the marketing compliance server 110 determines whether one or more layers/objects of a marketing asset 210 should be automatically corrected. To do so, in some embodiments, the marketing compliance server 110 is configured to determine whether a request to automatically correct a layer/object of a marketing asset 210 is received from the computing device 140 (e.g., in response to selection of the correction option 438 via the interactive compliance report 400). If, in decision block 318, the marketing compliance server 110 determines that one or more layers/objects of a marketing asset 210 should be automatically corrected, the method 300 advances to block 320. If, however, the marketing compliance server 110 instead determines that no layers/objects of a marketing asset 210 should be automatically corrected, the method advances to block 322.

In block 320, the marketing compliance server 110 automatically corrects one or more layers/objects of the marketing asset 210. To do so, the marketing compliance server 110 modifies one or more values (e.g., X/Y coordinates, dimensions, colors, horizontal alignment, vertical alignment, font type, font size, etc.) of the noncompliant layers/objects such that they conform to the brand rules. The method 300 then advances to block 322.

In block 322, the marketing compliance server 110 finalizes the approval process (e.g., in response to selection of the approval option 480 via the interactive compliance report 400). Once finalized, the approved/validated marketing assets 230 may be released for live use.

Figure 5A:
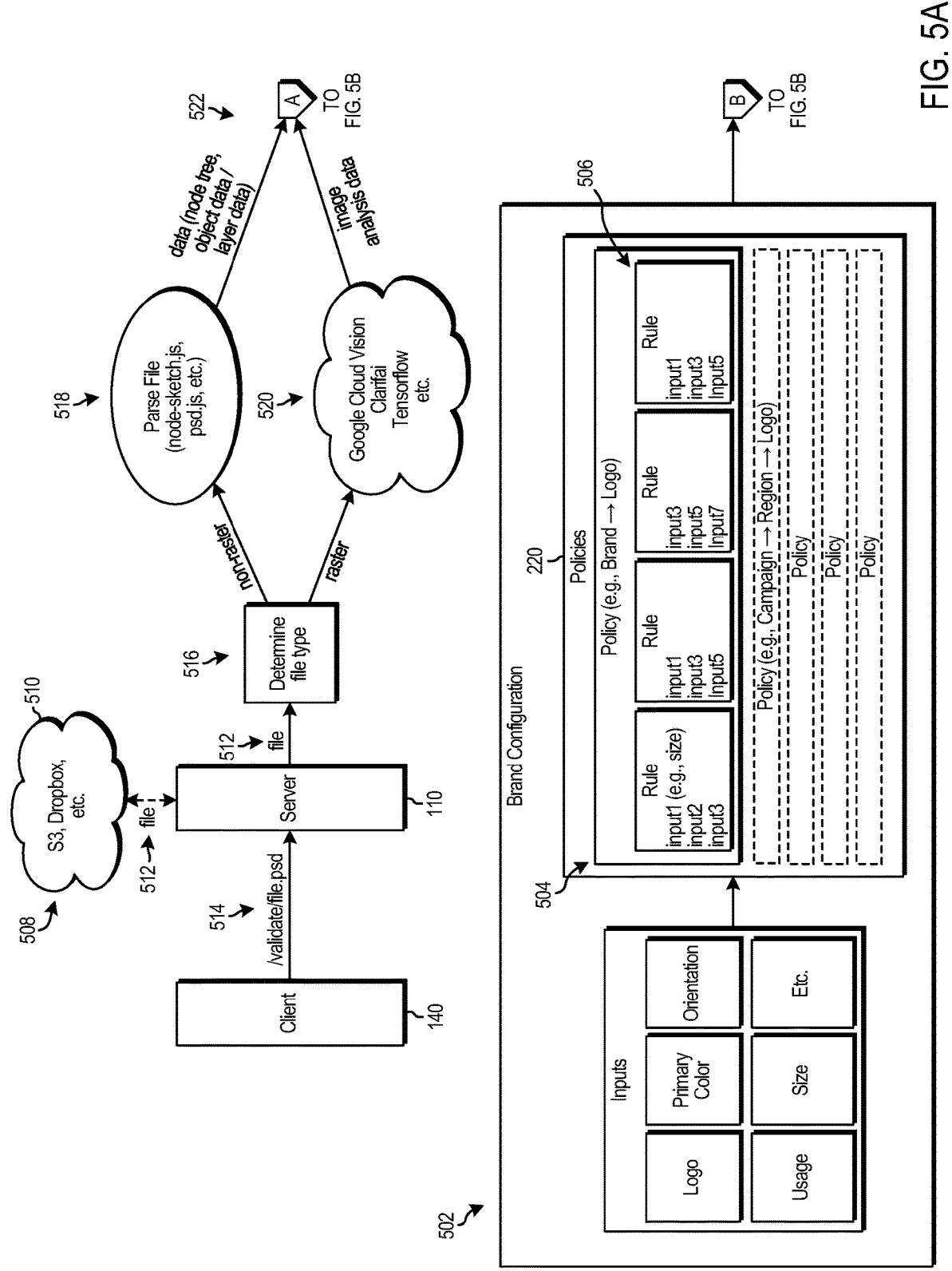
Figure 5C:
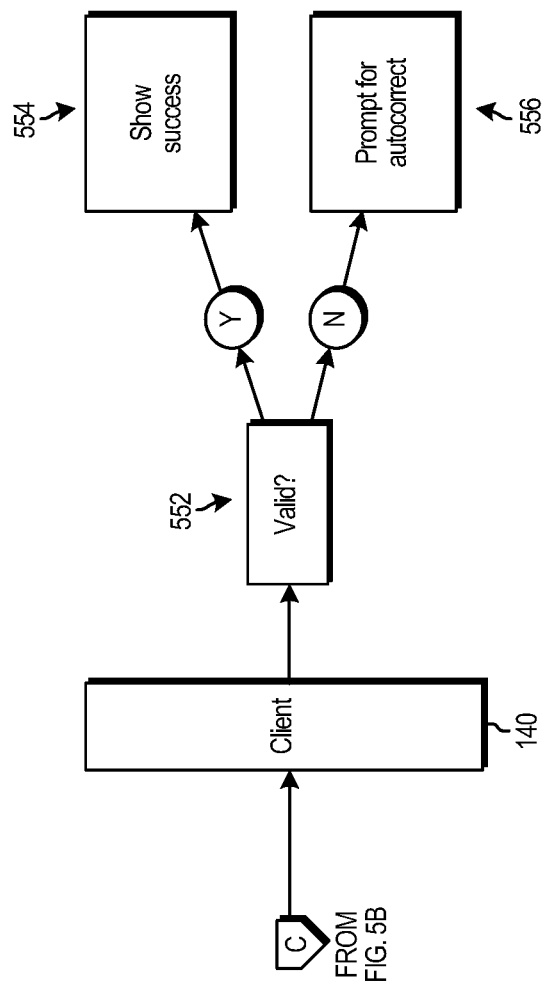

Referring now to FIGS. 5A-C, a simplified system processing flow diagram of another embodiment of compliance processing that may be performed by the marketing compliance server 110 for validating and correcting marketing assets (e.g., digital marketing assets, digitized versions of print marketing assets, etc.) is depicted. As shown in process flow 502, the marketing compliance server 110 generates one or more brand rule configuration file(s) 504 based at least in part on, or otherwise as a function of one or more brand rules 506. As discussed herein, the brand rules may be included within, or otherwise be representative of, one or more brand guidelines/policies 220, in some embodiments. In such embodiments, the brand guidelines/policies 220 may be developed for use in connection with a specific marketing campaign (e.g., seasonal, markets, launches, etc.), or they may be developed for global use by the company and/or brand owner. It should be appreciated that, in some embodiments, one or more of the brand rule configuration file(s) 504 and/or one or more of the brand rules 506 may be generated by, or configured on, a device other than the marketing compliance server 110 (e.g., via the computing device 140 or another computing device). In such cases, the marketing compliance server 110 may be configured to receive the one or more brand rule configuration file(s) 504 and/or brand rules 506 from the other computing device via one or more networks such as, for example, the networks shown in FIG. 1.

Turning back to FIGS. 5A-C, as shown in process flow 508, the marketing compliance server 110 receives a file 512 containing, or otherwise embodying, a marketing asset 210 from a remote storage device or service 510 (e.g., a storage server, a cloud-based storage platform, a remote server, etc.), in some embodiments. In such embodiments, the marketing compliance server 110 may retrieve the file 512 containing the marketing asset 210 from the remote storage device or service 510 in response to a request 514 received from a computing device 140. As discussed herein, the marketing asset 210 includes various objects or content (e.g., images, text, interactive objects, etc.) designed to promote a product or service of the brand. In some embodiments, the marketing asset 210 includes vector-based content, raster based content, or a combination of vector-based content and raster-based content. Additionally, the marketing asset 210 may be layered image file (e.g., a .SKETCH file, a .PSD file, etc.), in some embodiments. It should be appreciated that, in some embodiments, the marketing compliance server 110 may receive the file 512 containing the marketing asset 210 from the computing device 140 or another computing device. In other embodiments, the file 512 containing the marketing asset 210 may be stored in a local storage of the marketing compliance server 110. In such cases, the marketing compliance server 110 can retrieve the file 512 from local storage.

In process flow 516, the marketing compliance server 110 determines the file type of the file 512 received or otherwise retrieved from the remote storage device or service 510, computing device 140, local storage, or from any other suitable source. For example, as depicted in the illustrative embodiment of FIGS. 5A-C, the marketing compliance server 110 determines whether the file 512 contains a marketing asset 210 including non-raster objects (e.g., vector objects, etc.) or raster objects. As shown in process flow 518, if the marketing compliance server 110 determines (in process flow 516) that the marketing asset 210 contained within or otherwise embodying the file 512 includes non-raster objects, the marketing compliance server 110 unpacks or otherwise disassembles the received marketing asset 210 into its component parts, i.e., objects and/or layers. For example, the marketing compliance server 110 may be configured to unpack a received marketing asset 210 into the individual documents (e.g., .JSON documents, etc.) and raster images (e.g., background images, product images, model images, etc.) contained therein. In some embodiments, in process flow 518, the marketing compliance server 110 generates a hierarchical tree structure of the various layers/objects identified within the parsed documents of the marketing asset(s) 210.

As shown in process flow 520, if the marketing compliance server 110 determines (in process flow 516) that the marketing asset 210 contained within or otherwise embodying the file 512 includes only raster objects, the file 512 is sent to a cloud service or remote image processing device for image content analysis. It should be appreciated that any cloud service or remote image processing device capable of object detection, logo detection, content detection, facial recognition, landmark detection, label detection, etc. can be used to analyze the file 512 and/or the marketing asset 210 contained therein. In the illustrative embodiment, the cloud service or remote image processing device can be configured generate image analysis data representative of, or otherwise corresponding to, objects and/or content identified within the marketing asset 210 of the file 512.

In process flow 522, the data identified and/or generated by the marketing compliance server 110 (e.g., node tree, object data, layer data, etc.) or the image analysis data generated by the data identified by the cloud service/remote image processing device (e.g., objects, content, etc.) is processed by a validator 524. In some embodiments such as the one illustratively shown in FIG. 5B, the validator 524 forms part of the marketing compliance server 110. For example, in some embodiments, the marketing compliance server 110 may include a plurality of stored instructions, which when executed by a processor of the marketing compliance server 110, causes the processor to perform the functions of the validator 524 described herein. In other embodiments, the validator 524 is separate from the marketing compliance server 110. For example, in some embodiments, the validator 524 may be executed on a computing device other than the marketing compliance server 110 (e.g., a remote server, a cloud service, a virtual machine, etc.)

In the illustrative embodiment, the validator 524 of the marketing compliance server 110, in process flow(s) 526, processes each node (e.g., object, layer, etc.) of the marketing asset 210 and/or the image analysis data generated from the marketing asset 210. To do so, in process flow 528, the validator 524 first determines whether the data received for processing includes image analysis data. If the validator 524 of the marketing compliance server 110 determines that the data includes image analysis data, the validator 524, in process flow 530, uses the image analysis data to validate the content/objects of the corresponding marketing asset 210.

If, however, the validator 524 of the marketing compliance server 110 determines instead that the data does not include image analysis data, the validator 524, in process flow 532 retrieves the data to be validated from the marketing asset 210 of the file 512. To do so, in some embodiments, the validator 524 uses one or more data getters 538. In such embodiments, the validator 534 passes node identification data 534 to the data getters 538. The node identification data 534 can include information sufficient to identify a particular object and/or layer of the marketing asset 210 (e.g., a "node"). As should be appreciated, the validator 524 of the marketing compliance server 110 can use the node tree to facilitate identifying and requesting data corresponding to one or more objects and/or layers of the marketing asset 210 contained within the file 512. In response to receiving the node identification data 534 from the validator 524, the data getters 538 can parse the marketing asset 210 to retrieve specific attribute data 536 of the corresponding object/layer (e.g., "node") and return the parsed attribute data 536 to the validator 524 for further processing. In some embodiments, the data getters 538 may be embodied as one or more generic data getters 540. In such embodiments, the generic data getter(s) 540 may be configured to receive node identification data 534, parse the marketing asset 210, and return specific attribute data 536 of the corresponding object/layer in a common format. For example, the generic data getters 540 may be configured to translate requests to/from a common request syntax or format to a specific request syntax or format required by a particular data getter 538 (e.g., a data getter 538 for retrieving a specific attribute of an object/layer).

In process flow 542, the validator 524 of the marketing compliance server 110 determines whether the retrieved object/layer data corresponding to the identified node can be validated with one or more of the brand rule configuration files 504. If the validator 524 determines that the retrieved object/layer data can be validated, the validator 524, in process flow 544, validates the retrieved data as a function of the brand rule configuration file(s) 504. If, however, the validator 524 determines instead that the retrieved object/layer data cannot be validated (e.g., in embodiments in which the object/layer includes a raster object such as a poster image 546 or in embodiments in which all or a portion of required data is not available/present in a .JSON document), the validator 524, in process flow 548, transmits the retrieved object/layer to a cloud service or remote image processing device for image content analysis. In such cases, the cloud service or remote image processing device may return image analysis data representative of the objects and/or content identified within the retrieved object/layer. Thereafter, in process flow 530, the validator 524 uses the image analysis data to validate the content/objects identified within the retrieved object/layer, as described above.

The validator 524 of the marketing compliance server 110 also generates results 550 based on the outcome of process flow(s) 526. In the illustrative embodiment, the results 550 are transmitted to the computing device 140. In some embodiment, the results 550 may be included as part of an interactive compliance report (see interactive compliance report 400 of FIG. 4), which may also be generated by the marketing compliance server 110 and transmitted to the computing device 140. In such embodiments, the interactive compliance report 400 may be configured to indicate to a user (via the computing device 140) whether the marketing asset 210 (or an object/layer thereof) is valid (see process flow 552). In cases where the marketing asset 210 (or an object/layer thereof) is valid, the interactive compliance report 400 may be configured to indicate the validity of the marketing asset 210 (or the object/layer) to the user (see process flow 554). If, however, the marketing asset 210 (or the object/layer thereof) is not valid, the interactive compliance report 400 may be configured to provide the user with an option—see, e.g., option 438 of FIG. 4—to request automatic correction of the marketing asset 210 and/or the object/layer thereof (see process flow 556).

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for automatically validating marketing asset compliance, the method comprising:
   receiving, by a marketing compliance server, a marketing asset file, the marketing asset file comprises a data interchange document, the data interchange document comprises:
      a first object including a first plurality of key/value pairs, each key/value pair of the first plurality of key/value pairs corresponding to a different property of the first object, and
      a second object including a second plurality of key/value pairs, each key/value pair of the second plurality of key/value pairs corresponding to a different property of the second object;
   extracting, by the marketing compliance server, the data interchange document from the received marketing asset file;
   parsing, by the marketing compliance server, the data interchange document to identify the first plurality of key/value pairs and the second plurality of key/value pairs;
   identifying, by the marketing compliance server, the first object as a function of identifying the first plurality of key/value pairs and the second object as a function of identifying the second plurality of key/value pairs;
   analyzing, by the marketing compliance server, the first and second objects as a function of a brand rule configuration file, the brand rule configuration file comprises a plurality of brand rules corresponding to brand marketing guidelines, wherein each brand rule of the plurality of brand rules defines a content requirement or a visual appearance requirement of the brand marketing guidelines;
   determining, by the marketing compliance server, whether each of the first and second objects is in compliance or out of compliance with the brand marketing guidelines based on the analysis of the first and second objects as a function of the brand rule configuration file; and
   generating, by the marketing compliance server and in response to the determination, an interactive compliance report indicating whether each of the first object and the second object is in compliance or out of compliance with the brand marketing guidelines.

2. The method of claim 1, further comprising correcting, by the marketing compliance server, the first object of the data interchange document in response to determining that the first object is out of compliance with the brand marketing guidelines.

3. The method of claim 2, wherein correcting the first object of the data interchange document comprises modifying one or more key/value pairs of the first plurality of key/value pairs so that the first object is in compliance with the plurality of brand rules of the brand rule configuration file.

4. The method of claim 1, wherein the brand rule configuration file further comprises a plurality of reference values, each reference value is associated with a different brand rule of the plurality of brand rules; and
   wherein analyzing the first and second objects as a function of the brand rule configuration file comprises comparing the first plurality of key/value pairs of the first object and the second plurality of key/value pairs of the second object to the plurality of reference values of the brand rule configuration file.

5. The method of claim 1, further comprising generating, by the marketing compliance server and in response to identifying the first and second objects, a hierarchical tree structure.

6. The method of claim 1, wherein the data interchange document comprises a first data interchange document; and
   wherein the marketing asset file comprises a second data interchange document, the second data interchange document comprises a third object having a third plurality of key/value pairs, each key/value pair of the third plurality of key/value pairs corresponding to a different property of the third object.

7. The method of claim 1, wherein the data interchange document comprises a JavaScript Object Notation (.JSON) document.

8. The method of claim 1, wherein the marketing asset file comprises a layered image file.

9. The method of claim 1, wherein the data interchange document comprises a third object and a fourth object, each of the third and fourth objects comprises a layer object different from the first and second objects.

10. The method of claim 1, wherein the marketing asset file comprises vector-based content, raster-based content, or a combination of vector-based content and raster-based content.

11. The method of claim 1, wherein the first object comprises text-based content and the second object defines a vector graphic.

12. The method of claim 1, wherein the marketing asset file further comprises a raster-based graphic file, the first object comprises text-based content, and the second object is associated with the raster-based graphic file; and further comprising:
   extracting, by the marketing compliance server, the raster-based graphic file from the marketing asset file.

13. The method of claim 1, wherein receiving the marketing asset file comprises retrieving the marketing asset file from one of a local data storage device or a remote data storage device.

14. A marketing compliance server for automatically validating marketing asset compliance, the marketing compliance server comprising:
a processor executing instructions stored in memory, wherein the instructions cause the processor to:
receive a marketing asset file comprising a data interchange document, the data interchange document comprises:
a first object including a first plurality of key/value pairs, each key/value pair of the first plurality of key/value pairs corresponds to a different property of the first object, and
a second object including a second plurality of key/value pairs, each key/value pair of the second plurality of key/value pairs corresponds to a different property of the second object;
extract the data interchange document from the received marketing asset file;
parse the data interchange document to identify the first plurality of key/value pairs and the second plurality of key/value pairs;
identify the first object as a function of an identification of the first plurality of key/value pairs and the second object as a function of an identification of the second plurality of key/value pairs;
analyze the first and second objects as a function of a brand rule configuration file, the brand rule configuration file comprises a plurality of brand rules that correspond to brand marketing guidelines, wherein each brand rule of the plurality of brand rules defines a content requirement or a visual appearance requirement of the brand marketing guidelines;
determine whether each of the first and second objects is in compliance or out of compliance with the brand marketing guidelines based on the analysis of the first and second objects as a function of the brand rule configuration file; and
generate, in response to the determination, an interactive compliance report that indicates whether each of the first object and the second object is in compliance or out of compliance with the brand marketing guidelines.

15. The marketing compliance server of claim 14, wherein the instructions further cause the processor to correct the first object of the data interchange document in response to a determination that the first object is out of compliance with the brand marketing guidelines.

16. The marketing compliance server of claim 15, wherein to correct the first object of the data interchange document comprises to modify one or more key/value pairs of the first plurality of key/value pairs so that the first object is in compliance with the plurality of brand rules of the brand rule configuration file.

17. The marketing compliance server of claim 14, wherein the brand rule configuration file further comprises a plurality of reference values, each reference value is associated with a different brand rule of the plurality of brand rules; and
wherein to analyze the first and second objects as a function of the brand rule configuration file comprises to compare the first plurality of key/value pairs of the first object and the second plurality of key/value pairs of the second object to the plurality of reference values of the brand rule configuration file.

18. The marketing compliance server of claim 14, wherein the instructions further cause the processor to generate a hierarchical tree structure in response to identification of the first and second objects.

19. The marketing compliance server of claim 14, wherein the data interchange document comprises a first data interchange document; and
wherein the marketing asset file comprises a second data interchange document, the second data interchange document comprises a third object having a third plurality of key/value pairs, each key/value pair of the third plurality of key/value pairs corresponding to a different property of the third object.

20. The marketing compliance server of claim 14, wherein the marketing asset file further comprises a raster-based graphic file, the first object comprises text-based content, and the second object is associated with the raster-based graphic file; and
wherein the instructions further cause the processor to extract the raster-based graphic file from the marketing asset file.

* * * * *